2,981,594
PROCESS FOR REDUCING THE SILICA CONTENT OF ZIRCON

Alfred Richard Burkin, Brown Beeches, 116 Priests Lane, Shenfield, England, and Beresford Thomas Kingcome Barry, Appledore, 1 Hurst View Road, South Croydon, England No Drawing. Filed Jan. 7, 1957, Ser. No. 632,675
Claims priority, application Great Britain Jan. 11, 1956
3 Claims. (Cl. 23—18)

This invention concerns the treatment of silicate minerals to reduce the silica content of such minerals in the working up thereof for extraction of other constituents of the minerals. The invention is particularly concerned with the reduction of the silica content of the mineral zircon which has the empirical formula $ZrSiO_4$ although usually certain of the zirconium ions in the crystal lattice are replaced by hafnium ions; therefore in the present specification the term "zircon" is to be understood as including minerals in which a proportion of the zirconium ions are so replaced by hafnium ions.

Conventional techniques for the reduction of the silica content of silicate minerals, for example the substantial elimination of silica from zircon to obtain zirconium oxide or other zirconium compounds for the eventual extraction of zirconium metal, all suffer from one or more disadvantages such as high cost, unsuitable product, multiplicity of different stages, loss of reagents and difficulty of control. The present invention has for its object to provide a process which eliminates or reduces to substantial insignificance the disadvantages of the conventional techniques.

It is known that at elevated temperatures silica itself (e.g. quartz) dissolves in aqueous alkali solutions whereas some of the other individual constituents of silicate minerals do not dissolve in such solutions or do so to a much more limited extent than silica. It has now been found that aqueous alkaline solutions at elevated temperatures will attack zircon preferentially to dissolve the silica content thereof.

Thus the present invention provides, in its broadest aspect, a process for reducing the silica content of zircon, such process comprising leaching zircon with an aqueous alkaline solution at a temperature not less than about 270° C. for a time sufficient to dissolve at least part of the silica content of the zircon, and separating the undissolved material from such solution.

The rate at which silica is dissolved out of zircon by the leaching solution is dependent upon the temperature of the latter, its composition and concentration, and the particle size of the zircon being treated. Thus for any particular leaching solution composition, dissolution proceeds more rapidly at higher temperatures and at higher leaching solution concentrations than at lower temperatures and concentrations, whilst a decrease in particle size increases the rate of dissolution.

The lowest temperature for useful operation of the process is about 270° C. if it is assumed that the zircon and the leaching solution are maintained in intimate contact and local overheating of the zircon, whilst in contact with the leaching solution, e.g. by contact with elements such as container walls at temperatures above the mean temperature of the solution, is avoided. If, however, local overheating can occur, as, for example, in a batch process in which the zircon and the leaching solution are placed in an autoclave and the temperature raised to the desired level by heating the bottom of the autoclave and during this heating period there is little or no stirring of the contents of the autoclave, some dissolution of the silica content of the mineral will occur with final maximum temperatures of the leaching solution as low as 130° C. This, however, appears to be due to local overheating of the zircon, whilst in contact with the leaching solution, to temperatures of the order of 270° C. or higher so that the lower limiting temperature of about 270° C. specified herein for the process of the invention must be understood as referring to the maximum temperature reached by the zircon whilst in contact with the leaching solution, even when this temperature only occurs locally and for short periods.

Preferably, of course, the leaching operation will be carried out at the highest practical temperature having regard to the manner in which the operation is to be carried out and economical considerations; when the operation is carried out in autoclaves temperatures of the order of 300° C. may be employed and even higher temperatures are possible with equipment capable of withstanding the pressures involved. Thus it is possible that autoclaves could be operated at 310° C., although it is probable that it would be economically impracticable to operate at temperatures much above this value, about 320° C. probably being the highest temperature that could be employed in practice.

As indicated above, the rate of dissolution of the silica of zircon in the leaching solution is further dependent upon the composition and concentration of the leaching solution. Thus the rate of dissolution of the silica of zircon is increased as the leaching solution is made more caustic although the effect of raising the causticity of the solution becomes progressively less pronounced.

Experiment has shown that the rate of dissolution of the silica of zircon in the leaching solution, under similar conditions of operating temperature and zircon particle size, increases markedly as the causticity of the solution is raised to a value corresponding to an alkali metal hydroxide content of about 15%, whilst further causticization of the leaching solution has an effect substantially equivalent to increasing the concentration of the leaching solution by the addition of other alkalies, for example the alkali metal carbonates.

Thus it has been found that under otherwise similar conditions, a leaching solution containing 18% by weight of alkali metal hydroxide and 12% by weight of alkali metal carbonate dissolves the silica of zircon almost as rapidly as a leaching solution containing merely 30% by weight of alkali metal hydroxide.

Whilst, as discussed above, the composition of the leaching solution affects the rate of dissolution of the silica of zircon in such solution, this factor also affects the temperature at which the process may be operated. Thus the effect of changing the composition of the leaching solution is more marked at lower temperatures than at higher temperature and, in particular, the composition of the leaching solution effectively determines the lowest temperature at which significant rates of dissolution of the silica will occur. Thus if an operating temperature of about 270° C. is to be employed, a reasonable rate of dissolution of the silica will only be achieved if the leaching solution has an alkali metal hydroxide content of at least 15% by weight, whereas if an operating temperature of about 300° C. is to be employed, a leaching solution having an alkali metal hydroxide content as low as 10% by weight may be successfully used to achieve a reasonable rate of dissolution of the silica.

The leaching solution, will, therefore, preferably contain some alkali metal hydroxide such as caustic soda (NaOH) and in general the leaching solution will preferably contain not less than 10% to 15% by weight of alkali metal hydroxide, depending upon the operating temperature to be employed; desirably the leaching solution will contain about 20% by weight of alkali metal hydroxide to give a reasonable rate of dissolution of the silica under economic operation conditions. The leaching solution may also contain alkalies such as the alkali metal carbonates, e.g. sodium carbonate ($Na_2CO_3$), to raise the concentration of the leaching solution and further increase the rate of dissolution of the silica in such leaching solution under otherwise similar conditions.

Whilst raising the concentration of the leaching solution has only a relatively small effect upon the rate of dissolution of the silica in such solution, economic operation of the process will usually require the highest practicable concentration for the leaching solution; however, as indicated above, the desired concentration may be achieved by the addition of alkali metal carbonate to a leaching solution of lower concentration but of the desired causticity. It will be appreciated that in practice the leaching solution will almost inevitably become contaminated by the absorption of atmospheric carbon dioxide and so contain a proportion of alkali metal carbonate, but providing a reasonable causticity is maintained such contamination will have no deleterious effects.

Aqueous alkaline solutions of caustic soda with or without other constituents such as sodium carbonate are to be preferred for the process of the present invention on account of the ready availability of the constituents of such solutions and their low cost. However, solutions of, for example, caustic potash with or without potassium carbonate may be employed.

Furthermore, relatively small quantities of other salts may be incorporated in said aqueous alkaline solutions, sodium phosphate being a possible addition to a caustic soda or a caustic soda/sodium carbonate solution.

The particle size of the zircon being treated also has its effect upon the leaching conditions, the finer the particles the more rapid the dissolution of the silica in the leaching solution for any given composition and temperature of the latter. In practice, therefore, the zircon will be reduced to the minimum particle size economically feasible and compatible with economic separation of the undissolved residue from the leaching solution after the leaching. Particle sizes of the order of $1-5\mu$ would appear at present to be convenient, particles of sizes below this range tending to form colloidal suspensions with the leaching solution and particles of sizes above this range needing corresponding longer leaching periods. In general, the particle size should not exceed about $74\mu$ if effective dissolution of the silica (and any other soluble constituent) is to be achieved within a reasonable leaching period. It is found that where the zircon being treated contains particles of sizes ranging from below $74\mu$ to above this value, the smaller particles will be attacked by the leaching solution and lose most of their silica content to the latter whilst the larger particles will remain substantially unaffected except for surface attack. In some of the following examples, the zircon flour employed was a commercially-available material containing a large proportion of particles larger than about $74\mu$ and in these examples the loss of silica to the leaching solution was less than would have been the case had all the zircon had a particle size less than $74\mu$.

In practice of the process of the invention, therefore, either the zircon should all have a particle size of less than about $74\mu$ so that all particles will be substantially attacked, or zircon having a particle size range including a proportion of particles having sizes above about $74\mu$ may be treated, the solid residue from the leaching operation treated with acid to remove the acid-soluble constituents of the residue and the remainder of the latter discarded or ground to a finer particle size for further leaching.

The following examples illustrate the effect of changing the operating conditions in practicing the process of this invention. In these examples the process was carried out in an autoclave equipped with gas burners for heating the bottom and sides of the pressure vessel, and a mechanical stirrer for stirring the contents of the pressure vessel. In all cases the mineral was placed in the pressure vessel, the leaching solution added, the vessel closed and the gas burners lit to bring the vessel to the desired holding temperature; about 40 minutes heating was required to bring the contents of the pressure vessel to 300° C. Following holding at the desired temperature, the heating was discontinued and the pressure vessel permitted to cool. Thereafter the silica content of the leaching solution was determined by determining the amount of acid soluble material in the solid residue, it being assumed that the formation of acid-soluble constituents in the residue is equivalent to the dissolution of silica in the leaching solution.

The procedure followed to determine the proportion of acid-soluble constituents in the solid residue was as follows:

The contents of the pressure vessel were removed and the solid separated by filtration under vacuum. Thereafter the solid was washed in 250 cc. of water with vigorous agitation and then freed from the water by filtration under vacuum; the washing was repeated three further times, each time with 250 cc. of water.

Next the washed solid was dried at 130° C. Then an accurately-weighed sample of about 1 gram was boiled gently for three hours in 100 cc. of 3 N hydrochloric acid. The hot liquid and solid were transferred to a weighed centrifuge tube and centrifuged. The liquid was discarded and the solid washed several times with water, dried at 130° C. and weighed.

De-ionized water was used throughout the above procedure.

*Example 1*

Zircon sand having a particle size within the range $5-60\mu$ (43.5% $60/50\mu$) and containing initially 32.4% by weight silica ($ZrSiO_4$ contains 32.8% silica by weight) was leached for four hours at a temperature of 270° C. with a 30% solution of caustic soda; the solid residue contained 12.5% by weight of silica.

*Example 2*

A niobium/tantalum concentrate containing 4.00% by weight silica present almost entirely as zircon (7.88% $ZrO_2$) was leached for six hours at 270° C. with a 30% solution of caustic soda; the solid residue contained 6.22% $ZrO_2$ and 0.265% silica. It will be observed that had the concentrate contained all the silica as zircon, the zirconia content would have been 8.21% to give a silica content of 4.00%; thus in the concentrate a little of the silica was present in another form.

*Example 3*

100 grams of ground zircon all particles of which had a size less than $53\mu$ was leached for five hours at a temperature of 300° C. in one litre of a solution containing 180 grams caustic soda and 60 grams anhydrous sodium carbonate. 50% of the solid residue was soluble in hydrochloric acid. Repetition of this experiment with only 50 grams of the zircon gave a residue of which 46% was soluble in hydrochloric acid, showing that the ratio of alkali to zircon does not affect the process provided there is an adequate excess of alkali present.

*Example 4*

100 grams of zircon flour having a particle size analysis as follows:

|  | Percent |
|---|---|
| Greater than $211\mu$ | 0.00 |
| $211-152\mu$ | 0.20 |
| $152-124\mu$ | 8.58 |
| $124-104\mu$ | 7.22 |
| $104-89\mu$ | 35.76 |
| $89-76\mu$ | 17.33 |
| $76-53\mu$ | 19.18 |
| Less than $53\mu$ | Balance | was leached for five hours at a temperature of 270° C. in one litre of a solution containing 180 grams caustic soda and 60 grams anhydrous sodium carbonate. 12.6% of the solid residue was soluble in hydrochloric acid.

*Example 5*

100 grams of the zircon flour used in Example 4 was leached for 10 hours at a temperature of 280° C. in one litre of solution containing 180 grams caustic soda and 60 grams anhydrous sodium carbonate. 15.7% of the solid residue was soluble in hydrochloric acid.

*Example 6*

100 grams of the zircon flour used in Example 4 was leached for 10 hours at a temperature of 300° C. in one litre of a solution containing 180 grams caustic soda and 60 grams anhydrous sodium carbonate. 40.0% of the solid residue was soluble in hydrochloric acid.

In all these examples, the stirrer of the autoclave was only switched on when the desired holding temperature had been reached; hence it must be assumed that local overheating of the contents of the pressure vessel occurred during the heating-up period. During the stated period at the holding temperature the stirrer was operated continuously; in the following Example 7, the stirrer was only operated for periods of one minute every 15 minutes during the period at the holding temperature.

*Example 7*

100 grams of the zircon flour used in Example 4 was leached for five hours at a temperature of 290° C. in one litre of a solution containing 180 grams caustic soda and 60 grams anhydrous sodium carbonate. The solid residue contained 62.6% of material soluble in hydrochloric acid. This example shows that when leaching for half the time and at a lower holding temperature than in Example 6, a leaching solution of the same composition and concentration as in Example 6 dissolved about 50% more of the silica out of the zircon. This is assumed to be due to local overheating of the zircon whilst in contact with the leaching solution during periods when the stirrer was inoperative. This effect is also shown by the following Examples 8 and 9.

*Example 8*

100 grams of the zircon flour used in Example 4 was leached for five hours at a temperature of 300° C. in a solution containing 260 grams caustic soda and 60 grams anhydrous sodium carbonate. The stirrer was operated continuously during the heating-up period and during the period at the holding temperature of 300° C. The solid residue in this example contained 30.6% of material soluble in hydrochloric acid.

*Example 9*

The procedure of Example 8 was repeated but in this case the stirrer was inoperative during the heating-up period and only operated intermittently (one minute every 15 minutes) during the period at the holding temperature. The solid residue in this case contained 62.6% of material soluble in hydrochloric acid. Moreover, a repetition of this experiment under identical conditions gave a solid residue containing 68.8% of material soluble in hydrochloric acid.

These Examples 8 and 9 may usefully be compared with Examples 6 and 7; thus comparing Examples 6 and 8, it will be observed that the increased leaching solution concentration in Example 8 was more than offset in effect by the combined effects of avoiding local overheating and a shorter period at the holding temperature. Comparison of Examples 7 and 8 shows that the effects of a lower holding temperature and a lower leaching solution concentration may be more than offset by conditions permitting local overheating.

*Example 10*

In this case the procedure was modified to include a preheating of the zircon before leaching. Zircon flour as in Example 4 was used and 100 grams was placed in a furnace at 800° C. and the temperature of the latter then raised to 1000° C. during 1½ hours. The hot zircon was then raked into part of one litre of a solution containing 260 grams caustic soda and 60 grams anhydrous sodium carbonate. The solid and liquid were then transferred to the pressure vessel, the remainder of the solution added and the vessel closed and heated to 300° C. The stirrer was only started when the latter temperature had been reached, but was thereafter operated continuously as in Examples 1 to 6. The vessel was held at 300° C. for five hours. The resulting solid residue contained 35.6% of material soluble in hydrochloric acid.

This example, by comparison with Examples 8 and 9, shows that the preheating to shatter the surface of the zircon did not facilitate the dissolution of silica therefrom. In fact the preheating was disadvantageous in that the physical condition of the zircon deteriorated from the point of view of ease of handling.

In general, these examples show that useful rates of dissolution of the silica of zircon can be achieved with leaching solutions containing about 180 grams caustic soda and about 60 grams sodium carbonate per litre and leaching at temperatures upwards of 270° C. and preferably of the order of 300° C. While in the mixed alkali metal hydroxide-alkali metal carbonate solutions a solution containing about 18% hydroxide and about 6% carbonate is highly effective, these materials are preferably present in amounts ranging from about 15 to 28% alkali metal hydroxide and about 6 to 12% by weight alkali metal carbonate. It is found that the rate of dissolution of the silica under any given operating conditions is substantially constant.

In practice, the process of this invention may be carried out in several ways. Thus the leaching may be carried out in autoclaves or the like upon batches of zircon, and may be carried out in a single stage or in a succession of stages. Alternatively the process could be carried out continuously in towers or the like, the zircon and the leaching solution being passed continuously or semicontinuously through such towers or the like together or in counter-current. Such a continuous process could be carried out in a single stage or in a succession of stages. In such a continuous process it might be desirable or necessary to operate at reduced mean temperatures, i.e. temperatures of the order of 205° C. giving working pressures of the order of 250 lbs./square inch, but making provision for local overheating of the leaching solution whilst in contact with the zircon in order to achieve dissolution of the silica content of the latter.

Whether the process is operated batchwise or continuously, and in one or more stages, the spent leaching solution may be cooled and/or treated with reagents such as lime (CaO) to throw down the dissolved silica and to make the solution fit for reuse. In this connection it should be noted that the use of a leaching solution containing 180 grams caustic soda and 60 grams anhydrous sodium carbonate per litre is advantageous in that not only is it efficient in dissolving the silica of zircon at reasonable operating temperatures as discussed above, but it is also easily regenerated by the addition of lime which throws down calcium silicate and reacts with sodium carbonate present as a result of contamination of the leaching solution with atmospheric carbon dioxide to throw down calicum carbonate and produce caustic soda to give an equilibrium solution having the said composition. Assuming there is no contamination of the leaching solution by atmospheric carbon dioxide, in theory it is unnecessary to do more than merely add sufficient lime to convert the dissolved alkali metal silicate to calcium silicate and in so doing generate an equivalent amount of alkali metal hydroxide, thus restoring the alkali metal hydroxide/alkali metal carbonate balance of the starting solution. Thus regeneration of the leaching solution can be achieved by the addition of an inexpensive reagent (lime) which will restore, automatically, the original constitution of the solution regardless of contamination thereof by atmospheric carbon dioxide. Any loss of sodium ions from the solution may also be made good by the addition of the relatively inexpensive sodium carbonate. Thus such a leaching solution can be reused repeatedly with the use of only inexpensive regenerating reagents.

We claim:

1. A process for reducing the silica content of zircon, which comprises leaching finely divided unfused zircon with an aqueous alkaline solution containing between about 10% and about 30% by weight of an alkali metal hydroxide, maintaining intimate contact between the zircon and the alkaline solution at a temperature between about 270° C. and about 320° C., under sufficient pressure to maintain water of the solution in the liquid phase, for a period sufficient to dissolve a substantial part of the silica content of the zircon, cooling the mixture, and separating undissolved zirconium containing material from the resulting solution.

2. A process for reducing the silica content of zircon, which comprises leaching finely divided unfused zircon with an aqueous alkaline solution containing at least about 15% but below about 30% by weight of an alkali metal hydroxide, maintaining intimate contact between the zircon and the alkaline solution at a temperature above about 270° C. and below about 320° C., under sufficient pressure to maintain water of the solution in the liquid phase, for a period sufficient to dissolve a major portion of the silica content of the zircon, cooling the mixture, and separating undissolved zirconium containing material from the resulting solution.

3. A process for reducing the silica content of zircon, which comprises leaching finely divided unfused zircon with an aqueous alkaline solution containing about 15 to 28% by weight of alkali metal hydroxide and about 6 to 12% by weight of alkali metal carbonate, maintaining intimate contact between the zircon and the alkaline solution at a temperature between about 270° C. and about 320° C., under sufficient pressure to maintain water of the solution in the liquid phase, for a period sufficient to dissolve a major portion of the silica content of the zircon, cooling the mixture, and separating undissolved zirconium containing material from the resulting leaching solution.

References Cited in the file of this patent

UNITED STATES PATENTS

| 1,609,826 | Kinzie | Dec. 7, 1926 |
| 1,658,807 | Kinzie | Feb. 14, 1928 |
| 1,916,226 | Kinzie | July 4, 1933 |
| 2,696,425 | Kistler | Dec. 7, 1954 |
| 2,875,107 | Daiger | Feb. 24, 1959 |

FOREIGN PATENTS

| 709,882 | Great Britain | June 2, 1954 |

OTHER REFERENCES

Chemical News, vol. 49, page 174, Apr. 18, 1884.

Beyer et al.: U.S. Atomic Energy Comm., publication, ISC–437 (Rev.), Aug. 17, 1954.

Mellor: "Comprehensive Treatise on Inorganic and Theoretical Chemistry," vol. 6 (1925), page 350, and vol. 7 (1927), pages 101–103.

Jones: "Inorganic Chemistry," page 105, The Blakiston Co., Philadelphia, 1947.